(12) United States Patent
Zahirovic et al.

(10) Patent No.: US 10,328,407 B2
(45) Date of Patent: Jun. 25, 2019

(54) PARTICLE SEPARATING CATALYTIC CHEMICAL REACTOR AND PARTICLE SEPARATOR

(71) Applicant: HALDOR TOPSØE A/S, Kgs. Lyngby (DK)

(72) Inventors: Emir Zahirovic, Copenhagen NV (DK); Klaus Risbjerg Jarlkov, Kgs. Lyngby (DK); Karthik Gopal Manoharan, Chennai (IN); Flemming Plougstrup Nielsen, Roskilde (DK); Roberta Cenni, Birkerød (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 0 days.

(21) Appl. No.: 15/536,123

(22) PCT Filed: Dec. 16, 2015

(86) PCT No.: PCT/EP2015/080012
§ 371 (c)(1),
(2) Date: Jun. 14, 2017

(87) PCT Pub. No.: WO2016/102270
PCT Pub. Date: Jun. 30, 2016

(65) Prior Publication Data
US 2017/0341047 A1    Nov. 30, 2017

(30) Foreign Application Priority Data

Dec. 23, 2014 (IN) .......................... 3873/DEL/2014
Feb. 17, 2015 (EP) .................................. 15155379

(51) Int. Cl.
*B01J 8/00* (2006.01)
*B01J 8/02* (2006.01)
*B01J 8/04* (2006.01)
(Continued)

(52) U.S. Cl.
CPC ............ *B01J 8/0065* (2013.01); *B01J 4/002* (2013.01); *B01J 4/005* (2013.01); *B01J 8/0085* (2013.01);
(Continued)

(58) Field of Classification Search
CPC . B01J 4/002; B01J 4/005; B01J 8/0065; B01J 8/0085; B01J 8/0278; B01J 8/0492; C10G 49/002; C10G 67/02
See application file for complete search history.

(56) References Cited

U.S. PATENT DOCUMENTS

| 4,664,888 A | 5/1987 | Castagnos, Jr. |
| 2004/0086435 A1 | 5/2004 | Boyer et al. |

(Continued)

FOREIGN PATENT DOCUMENTS

| AU | 620129 B2 | 2/1992 |
| EP | 0 222 436 A2 | 5/1987 |

(Continued)

OTHER PUBLICATIONS

International Search Report with Written Opinion corresponding to International Patent Application No. PCT/EP2015/080012, dated Apr. 1, 2016.

(Continued)

*Primary Examiner* — Brian A McCaig
(74) *Attorney, Agent, or Firm* — Leydig, Voit & Mayer, Ltd.

(57) ABSTRACT

A particle separating catalytic reactor comprising a kinetic particle separator.

14 Claims, 6 Drawing Sheets

(51) Int. Cl.
  *B01J 4/00* (2006.01)
  *C10G 67/02* (2006.01)
  *C10G 49/00* (2006.01)

(52) U.S. Cl.
  CPC .......... *B01J 8/0278* (2013.01); *B01J 8/0492* (2013.01); *C10G 49/002* (2013.01); *C10G 67/02* (2013.01); *B01J 2208/00761* (2013.01); *B01J 2208/00902* (2013.01); *B01J 2219/00247* (2013.01)

(56) References Cited

U.S. PATENT DOCUMENTS

| | | |
|---|---|---|
| 2009/0177023 A1 | 7/2009 | Koudil et al. |
| 2014/0231309 A1 | 8/2014 | Bazer-Bachi et al. |

FOREIGN PATENT DOCUMENTS

| | | |
|---|---|---|
| EP | 0 358 923 A1 | 3/1990 |
| EP | 1 382 376 A1 | 1/2004 |
| GB | 862214 A | 3/1961 |
| WO | WO 2013/045770 A1 | 4/2013 |
| WO | WO 2016/102342 A1 | 6/2016 |

OTHER PUBLICATIONS

International Search Report with Written Opinion corresponding to International Patent Application No. PCT/EP2015/080406, dated Mar. 1, 2016.

Extended European Search Report dated Feb. 22, 2016 corresponding for European Patent Application No. 15171403.7.

U.S. Appl. No. 15/527,952, filed Nov. 18, 2015, dated May 18, 2017.

PARTICLE SEPARATING CATALYTIC CHEMICAL REACTOR AND PARTICLE SEPARATOR

CROSS-REFERENCE TO RELATED APPLICATIONS

This application is a 35 U.S.C. § 371 filing of International Application No. PCT/EP2015/080012, filed Dec. 16, 2015, which claims the benefit of and priority to Indian Patent Application No. 3873/DEL/2014, filed Dec. 23, 2014 and European Patent Application No. 15155379.9, filed Feb. 17, 2015, each of which is hereby incorporated by reference in its entirety.

FIELD OF THE INVENTION

This invention relates to a catalytic chemical reactor with particle separation. More specifically the invention relates to a reactor with a separator which uses kinetic particle separation. Further the invention relates to a kinetic particle separator. The reactor can be a down-flow catalytic reactor which includes vertically superimposed packed beds of particulate catalytic material. This type of reactor is used in the petroleum and chemical processing industries for carrying out various catalytic reactions, such as sulphur and nitrogen conversion (HDS/HDN); hydrogenation of: olefins (HYD) and aromatics (hydrodearomatisation—HDA), metals removal (hydrodemetallisation—HDM), oxygen conversion (hydrodeoxygenation—HDO) and hydrocracking (HC). Alternatively, the reactor is a radial converter, where elements of the decks have to be fixed to the reactor. This reactor has a radial flow crossing a packed bed of catalytic material and it is typically used in the petroleum and chemical processing industries for carrying out catalytic reactions such catalytic reforming and ammonia synthesis.

BACKGROUND OF THE INVENTION

Particle separation and classification are well explored need of the chemical, pharmaceutical, mineral and food industries. While particle classification in industrial processes may be required to improve the quality of a certain product, particle separation may be necessary to purify a fluid stream or to avoid problems to process equipment.

Sometimes particles are intentionally present in the process stream. This is for example the case of combustion processes based on pulverised fuels or production of pharmaceutical or specialty chemicals using powder technology. In other cases the presence of particles is unintentional. This is for example the case of some refineries streams, effluents from fluidized beds, product streams from Fischer Tröpsch reactors. Particles may have various origins: they may be part of the original feedstock and other reactant streams or they may be generated in and collected from process equipment, for example as erosion products. Particles may be solid or liquid, may have organic nature, like char, coke and gums, or inorganic nature, like salts, debris or corrosion and erosion as iron components, or debris of catalyst particles. They may be liquid, as some aqueous mists, and containing living impurities as bacteria. Shape and size may also vary greatly—from sphere to flakes, from millimeters to a few microns or less. If the particles are unwanted in the downstream process, often, a filter, or other suitable particle separation technology known in the art, removes large part of these particles prior to sensitive equipment. However, in certain processes, the problem may appear or become more severe over time, for example when erosion and corrosion are involved. Sometimes, installing a particle removing equipment as an independent unit operation prior to sensitive equipment is not possible in practice.

One specific example of problems generated by particles may be seen in naphtha hydrotreating. The feed to a hydrotreating reactor is sometimes laden with particles. When the particle laden feed is introduced into the hydrotreating reactor the particles tend to scale rapidly on the grading or the catalyst.

Reactors may thus require frequent skimming of the affected layers of the bed to contain the pressure drop build-up in the reactor. A frequency of once every 5-6 months or even of once every 2-3 months for skimming is not uncommon.

A characterization of the particles affecting a naphtha hydrotreater is seldom available. In fact the particles depend upon the naphtha feedstock or process related issues (rust, salts, gums, etc.). On-stream collection of the particles is typically not available. Thus, particle characterization relies on post-mortem analyses, which are affected by large uncertainties due to particle agglomeration and oxidation.

Similarly, process gas resulting from the regeneration of FCC (fluid catalytic cracking) catalyst is often laden with catalyst particles and catalyst debris. Such gas may be conveyed to a sulphur recovery unit, most commonly a Claus plant, for the recovery as elemental sulphur, or a WSA plant, for the recovery of sulphur as concentrated sulphuric acid. These are catalytic fixed bed reactors which are prone to plugging if exposed to a particle-laden feedstock. The particles commonly present at the exit of the FCC regenerator is generally in the 2 to 20 micron size range or below.

US2009177023 discloses a filtration tray for a fixed bed reactor with a co-current down-flow of gas and liquid. The device can trap plugging particles contained in the liquid feed supplying a reactor functioning in gas and liquid co-current down-flow mode using a specific distributor tray comprising a filtration medium. The device is of particular application to the selective hydrogenation of feeds containing acetylenic and dienic compounds.

EP0358923 discloses a process and an apparatus for purifying a raw gas originating from the gasification of solids. In a process and apparatus for purifying raw gas from solids gasification, containing granular and dusty solids particles, a solution is to be found, by means of which solids particles of any size are largely removed from the raw gas before entry to downstream cooling devices. This is achieved when the raw gas is passed in a first purification stage from the gasification zone in a straight line in the direction of a gas-holding space, whereby the granular solids particles are precipitated at the bottom of the gas-holding space and then, in a second purification stage, the partially purified raw gas is laterally deflected from the gas-holding space and undergoes a change to a velocity reduced by a factor of at least 3 and, after a further gas deflection, is passed substantially in the vertical direction through a solids filter, where the dusty solids particles are removed from the raw gas.

In spite of the above mentioned known art, a need exists for a reactor with a particle separator to ensure prolonged effective operation of the reactor despite any particle impurities in the inlet fluid stream to the reactor.

SUMMARY OF THE INVENTION

The present invention describes a novel catalytic chemical reactor comprising a particle separation system, a kinetic particle separator. With minor modification, the present invention may be used to selectively separate particles of certain aerodynamic diameters, a process otherwise known as particle or powder classification. Powder classification is necessary to improve performances of production processes in the chemical, mineral, pharmaceutical, or food industry, where the size of the particles is of essence. Application of powder classification for research purposes are also known in the art.

According to the invention, particles are separated from a fast flowing fluid stream by trapping them in a region of quasi static flow. Trapping of the particles is obtained by applying forced draft in various steps and fashions, as required under consideration of the inertial properties of the particles, to divert the particle momentum from regions of high to regions of low, quasi static, gas velocity.

In an industrially operating unit, the principle of particle trapping by momentum diversion may or may not be combined with other principles used in the art.

FEATURES OF THE INVENTION

1. Particle separating catalytic reactor for chemical reactions, comprising a kinetic particle separator for separating particles from the inlet fluid stream to the reactor, wherein said kinetic particle separator comprises at least one acceleration channel, flow splitting section, particle deceleration section, collection chamber and gas exit channel.

2. Particle separating catalytic reactor according to feature 1, wherein the particle separating reactor further comprises at least one particle settling section for primary separation of particles from the inlet fluid stream, the particle settling section is located upstream of the kinetic particle separator 3. Particle separating catalytic reactor according to any of the preceding features, wherein the particle settling section comprises a perforated inlet diffuser.

4. Particle separating catalytic reactor according to any of the preceding features, wherein said settling section comprises an initial kinetic particle separator located downstream the reactor fluid inlet and upstream of the kinetic particle separator.

5. Particle separating catalytic reactor according to any of the preceding features, wherein said settling section comprises at least one transfer chimney for transition of the fluid stream from the settling section to the kinetic particle separator.

6. Particle separating catalytic reactor according to any of the preceding features, wherein said at least one transfer chimney is arc shaped.

7. Particle separating catalytic reactor according to any of the preceding features, wherein said kinetic particle separator comprises a plurality of particle separator units arranged in a cluster.

8. Particle separating catalytic reactor according to any of the preceding features, wherein said kinetic particle separator further comprises at least one laminated structure located between the acceleration channel and the deceleration section.

9. Particle separating catalytic reactor according to any of the preceding features, wherein said deceleration chamber comprises an angled impingement wall for guiding separated particles from the deceleration chamber to the collection chamber.

10. Particle separating catalytic reactor according to any of the preceding features, wherein said acceleration channel comprises bailer type fluid connections from the acceleration channel to the collection chamber, thereby providing a lower pressure in the collection chamber relative to the acceleration channel for flow guidance of the particles from the deceleration section to the collection chamber.

11. Particle separating catalytic reactor according to any of the preceding features, wherein said acceleration channel has a variable cross section area.

12. Particle separating catalytic reactor according to feature 11, wherein the variable cross section area is provided by shutting of a part of the cross section by a guide.

13. Particle separating catalytic reactor according to any of the preceding features, wherein the kinetic particle separator comprises a common serviceable outlet from the at least one collection section for removing collected particles during service.

14. Particle separating catalytic reactor according to any of the preceding features, wherein the reactor body is cylinder shaped in the section between the top and the bottom of the reactor and at least one, preferably two cluster sections of a plurality of kinetic particle separators are arranged in a line in the vicinity of the diameter of the reactor.

15. A kinetic particle separator for separating particles from a fluid stream, wherein said kinetic particle separator comprises at least one acceleration channel, flow splitting section, particle deceleration section, collection chamber and gas exit channel.

16. A kinetic particle separator according to feature 15, wherein said kinetic particle separator comprises a plurality of particle separator units arranged in a cluster.

17. A kinetic particle separator according to any of the features 15-16, wherein said kinetic particle separator further comprises at least one laminated structure located between the acceleration channel and the deceleration section.

18. A kinetic particle separator according to any of the features 15-17, wherein said deceleration chamber comprises an angled impingement wall for guiding separated particles from the deceleration chamber to the collection chamber.

19. A kinetic particle separator according to any of the features 15-18, wherein said acceleration channel comprises bailer type fluid connections from the acceleration channel to the collection chamber, thereby providing a lower pressure in the collection chamber relative to the acceleration channel for flow guidance of the particles from the deceleration section to the collection chamber.

20. A kinetic particle separator according to any of the features 15-19, wherein said acceleration channel has a variable cross section area.

21. A kinetic particle separator according to feature 20, wherein the variable cross section area is provided by shutting of a part of the cross section by a guide.

22. A kinetic particle separator according to any of the features 15-21, wherein the kinetic particle separator comprises a common serviceable outlet from the at least one collection section for removing collected particles during service.

23. Use of a particle separating catalytic reactor comprising a kinetic particle separator according to any of the preceding features for hydroprocessing.

BRIEF DESCRIPTION OF THE DRAWINGS

The invention is further illustrated by the accompanying drawings showing examples of embodiments of the invention.

POSITION NUMBERS

01. Kinetic particle separator.
02. Particle settling section.
03. Acceleration channel.
04. Flow splitting section.
05. Particle deceleration section.
06. Collection chamber.
07. Perforated inlet diffuser.
08. Initial kinetic particle separator.
09. Transfer chimney.
10. Screening surface (e.g., Laminated structure).
11. Angled impingement wall.
12. Bailer type fluid connections.
13. Exit channel.

Figure 3:
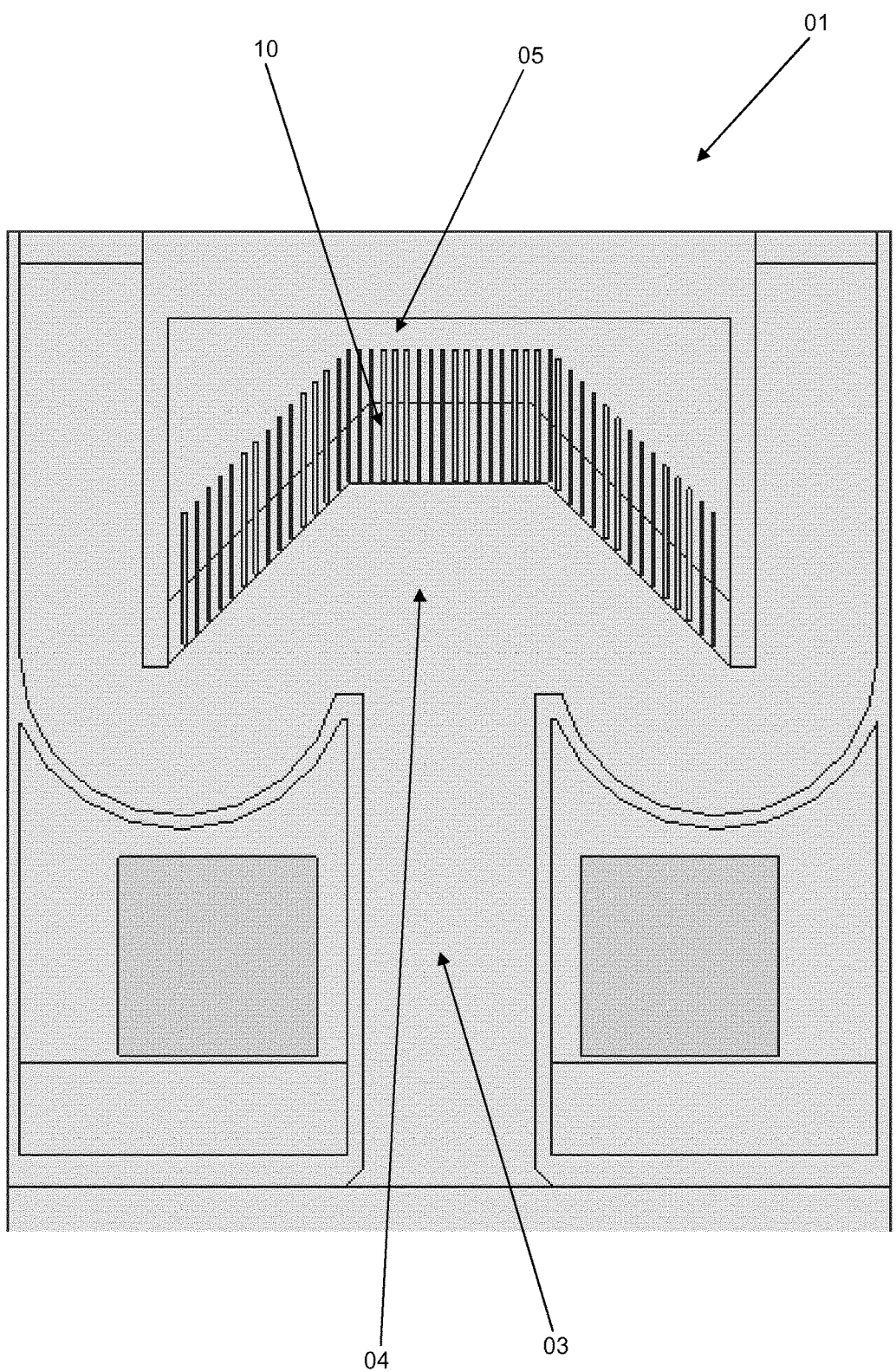
FIG. 3 shows a top view of a detail of a kinetic particle separator for a catalytic chemical reactor (not shown) according to an embodiment of the invention.
Figure 4:
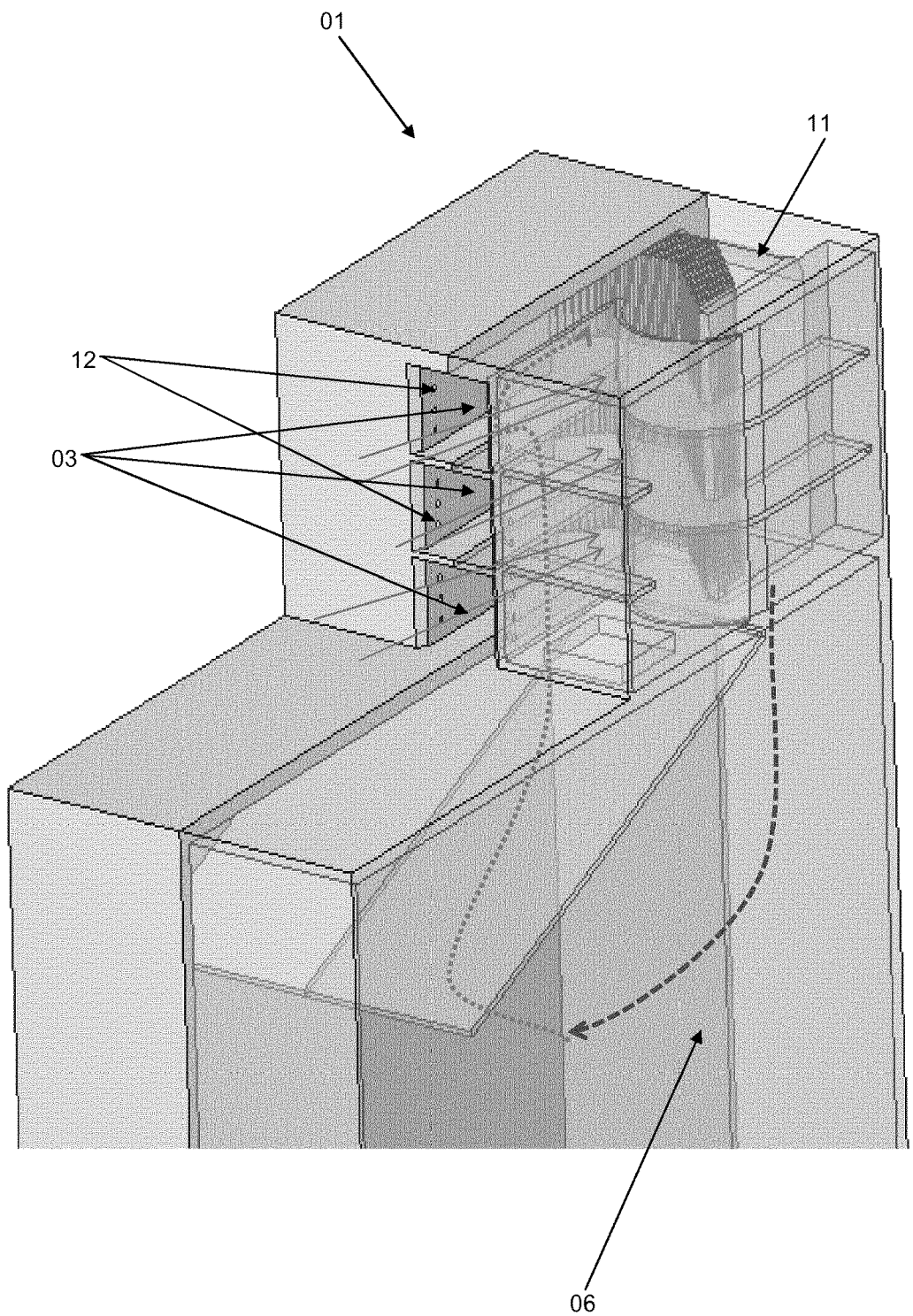
FIG. 4 shows an isometric view of a detail of a kinetic particle separator for a catalytic chemical reactor (not shown) according to an embodiment of the invention.

In the acceleration channel 03, the particle-laden fluid (e.g. gas) is accelerated towards a screening surface, a laminated structure 10, behind which the particle deceleration section 05 is positioned, see FIGS. 3 and 4. At the exit of the acceleration channel, the fluid and the particles are pushed towards the laminated structure. Behind the laminated structure, the gas is still in the particle deceleration section. While the particles continue their journey through the screening surface and into the particle deceleration section due to inertia, the gas streamlines are forced to change abruptly direction and to follow the open passage in a labyrinth shaped chamber (flow splitting section 04). The gas flow is subject to multiple changes in direction.

The particles carried by the gas have a higher inertia than the gas. Particles smaller than a certain cut-off aerodynamic diameter have too small inertia and will follow the gas streamlines. The kinetic particle separator 01 system will be ineffective against these particles. Particles larger than the cut-off aerodynamic diameter will continue their motion and will enter the screening wall.

From the deceleration section behind the screening wall, the particles are transported into the collection chamber 06. Transport occurs by means of gravity and gas draft. Gas draft is necessary to ensure that small particles are promptly led away from the deceleration section in order to avoid the risk that particles are re-entrained in the gas and find their way out of the deceleration chamber and back into the flow-splitting chamber.

Particles in the collection chamber, or their agglomerates, fall by gravity in the bottom of the chamber.

Gas draft may be created in many ways. In one embodiment, gas draft is created by providing the collection chamber with holes, bailer type fluid connections 12 connecting the collection chamber to the acceleration section. The gas streaming with high velocity in the acceleration channel creates under pressure at the walls. By suction, gas from the collection chamber is moved to the acceleration chamber creating a draft in the collection chamber and in the particle deceleration chamber.

Important design details in determining the separation efficiency of the device are in all sections.

- The design of the acceleration section determines the velocity of the particles at the screening wall. In general terms, the aerodynamic diameter of the particles that may be separated is inversely related to the particle velocity at the screening wall.
- The design of the labyrinth determines the velocity of the gas at the screening wall. In general terms, the aerodynamic diameter of the particles that may be re-entrained in the gas is directly related to the magnitude of the gas velocity vector in this section.
- The screening wall has the purpose of separating the labyrinth from the deceleration chamber. The screening wall allows the passage of the particles to the deceleration chamber, but minimizes the formation of vortices or sweeping flows that may re-entrain the particles and carry them back to the labyrinth. Besides fluid dynamics, the design of the screening wall has to consider physical particle properties, for example stickiness, that may render difficult the operability of the system.

The deceleration chamber is dimensioned such that the particles do not hit the walls of the chamber. Here, the particles motion under inertial forces is decelerated and diverted by gas draft and gravity before the particles hit the wall. In case the particles do hit the back wall of the deceleration chamber, this may be angled 11 to impinge the particles downwards to the collection chamber.

The collection chamber's volume is dimensioned in relation to the expected amount of particles to capture. Important features of the collection chamber are:

(a) The creation of draft to ensure that particles are promptly diverted from the deceleration chamber.
(b) The presence of devices that impede the motion of the particles towards any openings that connect the collection chamber to the acceleration chamber or the labyrinth.
(c) An opening port to allow easy withdrawal of the accumulated particles (not shown).

Designing of the sections and the velocity profiles of the gas is performed having regards for the gas viscosity and the gas density, which contribute in defining the aerodynamic diameter of the particles that may be separated (cut-off diameter). The cut-off diameter may not be given in absolute terms but rather in terms of probability.

The size of the particles that may be removed by the kinetic particle separator depends upon the velocity of the gas in the flow-splitting section: the higher the velocity, the smaller the particles. However, high velocity through the acceleration section may not be obtained without increasing the pressure drop across the device.

For certain applications, as for example a particle laden naphtha feedstock to a hydrotreater, the size and nature of the particles to be captured is not known in advance. Thus, designing the device to capture very tiny particles gives an unnecessary pressure drop across the device. Ideally the design should be made such to collect sufficient particles to allow the reactor to run a full cycle, however without increasing the pressure drop unnecessarily.

The kinetic particle separator of an embodiment of the present invention includes mechanical provisions that allow flexibility in the cross section of the flow in the acceleration chamber. There are several methods to achieve this purpose. In one embodiment, the acceleration chamber may be created by a cluster of smaller acceleration chambers. The overall acceleration cross section may be adjusted by opening a certain fraction of the acceleration chambers (not shown). The velocity of the gas in the labyrinth may thus be changed. With this technology, the performances of the equipment may be tailored at site, to ensure optimal balance between the scale-catching performances and the pressure drop across the equipment.

Depending upon the design of the screening wall and the deceleration chamber, these elements may suffer operational performances if the particles entering the kinetic separator are too coarse. These particle may be conveniently collected upstream the kinetic separator by methods known in the art.

Figure 1:
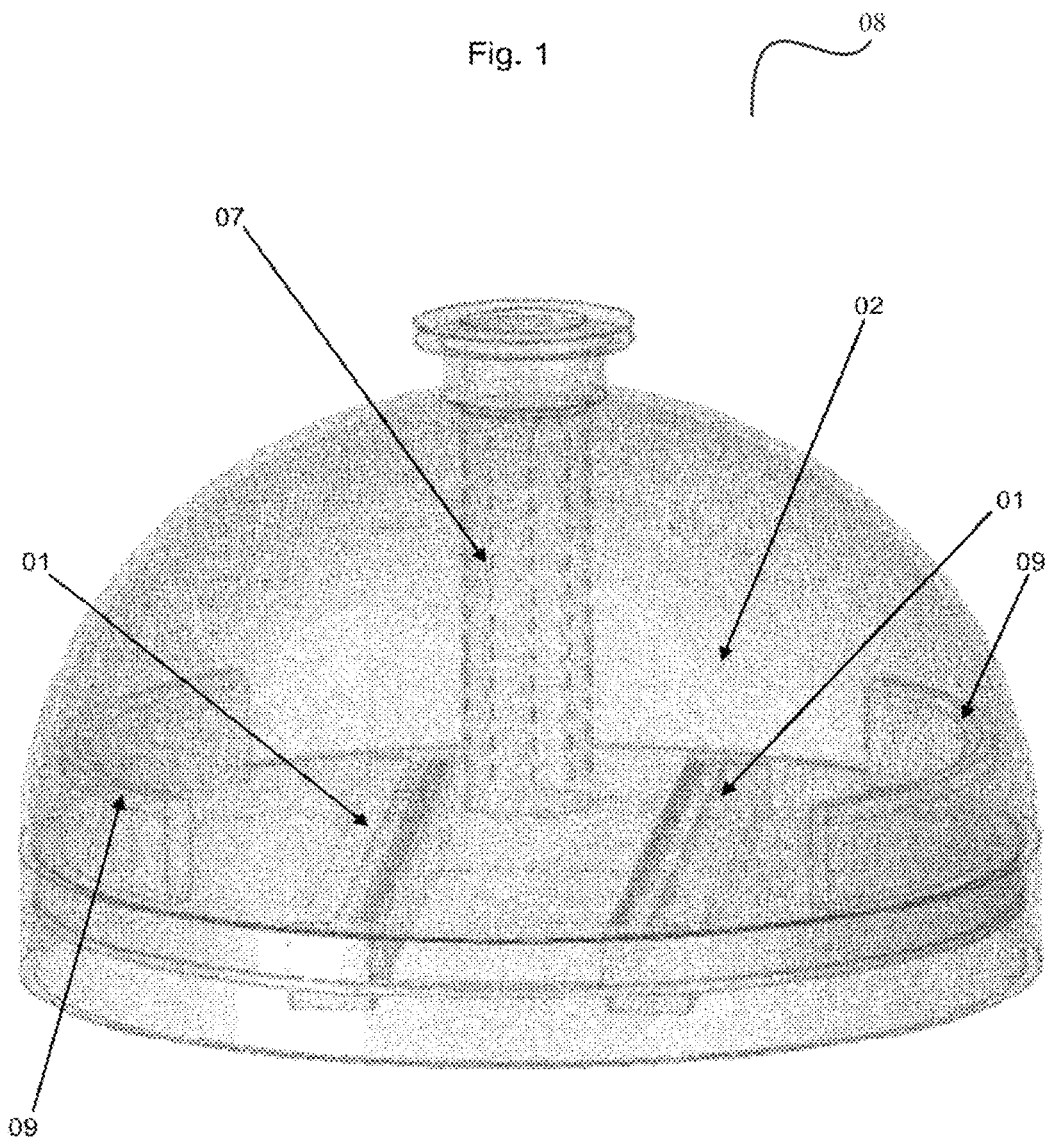
FIG. 1 shows an isometric view of a kinetic particle separator for a catalytic chemical reactor (not shown) according to an embodiment of the invention.

In one embodiment as shown in FIG. 1, the separation of the coarse particles may be made by means of settling in an initial kinetic particle separator 08. In this embodiment, the gas is introduced through a perforated inlet diffuser 07. The inlet diffuser is designed in a special fashion such that the gas flow streams in parallel direction with respect to the tray shaped kinetic particle separator. Also, the gas flows at low velocity, to allow coarse particles to settle in the storage space under the particle settling section 02. The gas flows to the kinetic particle separator through down comers, transfer chimneys 09. These may be shaped like chimneys, conventionally used in the art, or like half-moons, like in this embodiment. The shape of the down corners is dictated by fluid dynamic considerations and by other constraints. For example, if an existing reactor is retrofitted with a particle separator of this invention, the total height pf the tray may be limited.

The inlet diffuser used for the purpose described here is especially designed with regards to fluid dynamic considerations, such that the right velocity profiles are ensured. Besides, the design requires regard for the presence of particles and the likelihood of particle settling and accumulation inside the inlet diffuser itself.

According to the current knowledge, particles affecting further processing have a size below 1 and up to 1000 micron, density from 700 to 4000 kg/m3 and shapes ranging from sphere to flakes and needles.

Figure 2:
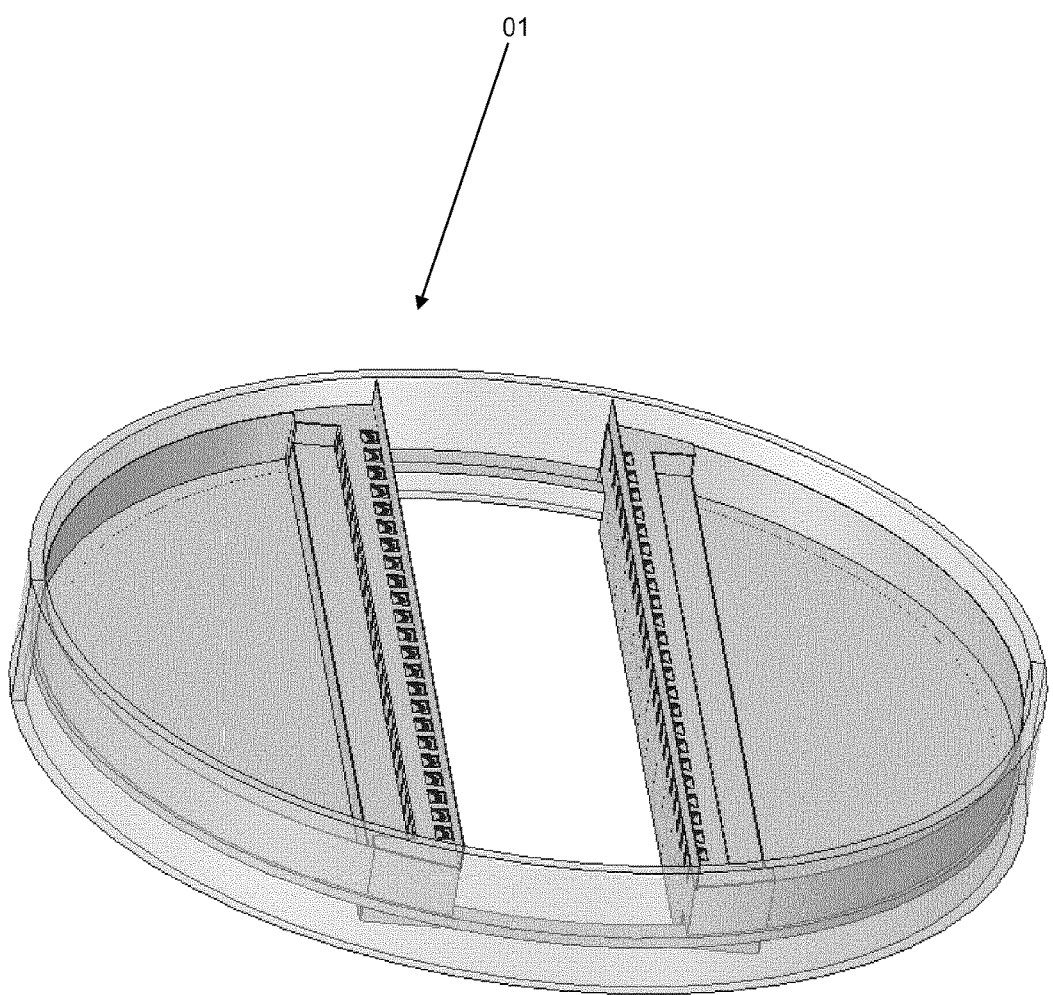
FIG. 2 shows an isometric view of a detail of a kinetic particle separator for a catalytic chemical reactor (not shown) according to an embodiment of the invention.
Figure 5:
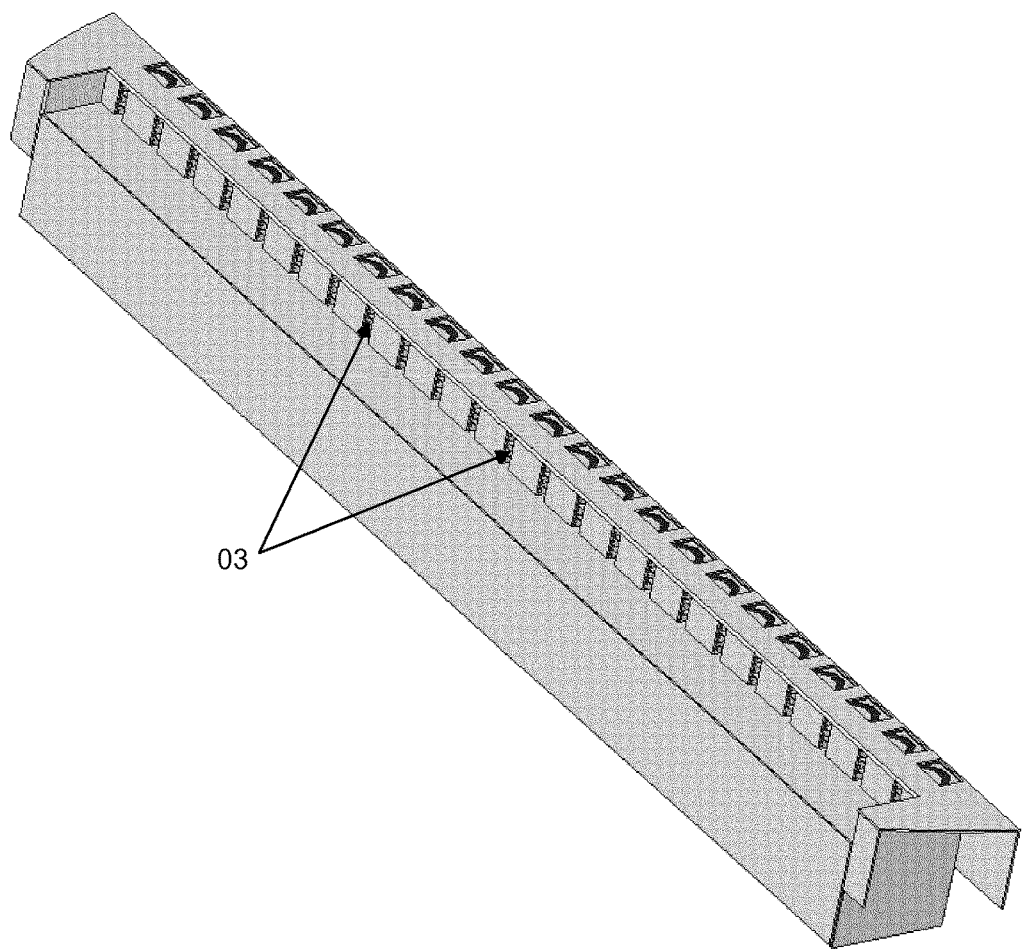
FIG. 5 shows an isometric view of a detail of a kinetic particle separator for a catalytic chemical reactor (not shown) according to an embodiment of the invention.
Figure 6:
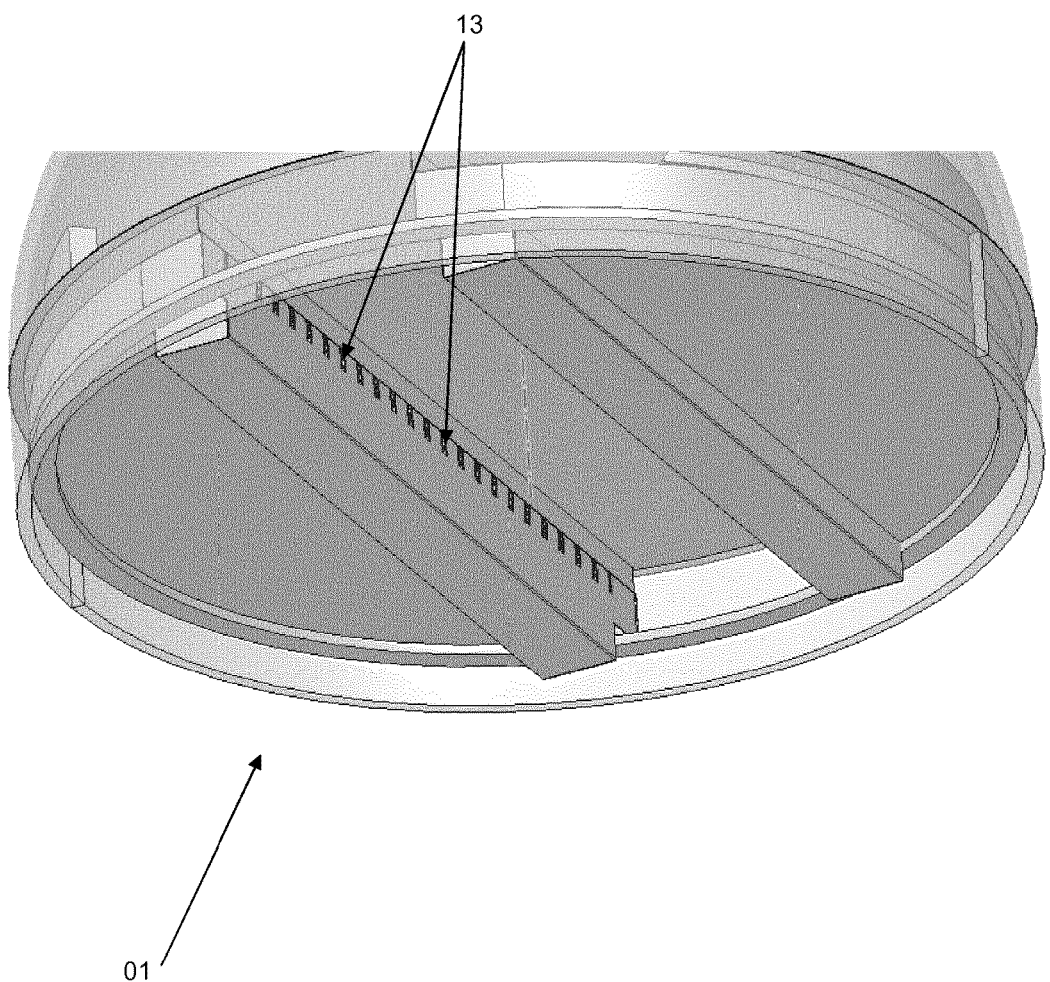
FIG. 6 shows an isometric view of a detail of a kinetic particle separator for a catalytic chemical reactor (not shown) according to an embodiment of the invention.

In FIGS. 2 and 6 the kinetic particle separator is shown made as two clusters, trays comprising a plurality of single sections each comprising acceleration channels, laminated structure, flow splitting section, particle deceleration section collection chamber and gas exit channels 13. A more detailed view of one of these clusters/trays is shown on FIG. 5.

Example

1) In first example, the invention is performed as a kinetic particle separator in a naphtha hydroprocessing reactor. The targeted aerodynamic cut-off diameter of 5 micron and a density of 2000 kg/m3, with a maximum pressure drop across the scale catcher of 2000 Pa. The adjustable number of acceleration chambers allows to relent these requirements to an aerodynamic cutoff diameter of 30 micron and a density of 2000 kg/m3. The kinetic particle separator is built in the shape of a tray on support beams or on a self-supporting structure, thus minimizing the space required to ensure mechanical strength, to the benefit of the volume used for particle collection, and it is installed inside the reactor by means of a support ring.

2) In a second example, the invention is again performed on an hydroprocessing reactor with similar process characteristics as in the first example. The invention however is incorporated in the inlet distributor and hangs from the roof.

3) In a third example, the invention is performed by integrating the principle of terminal velocity separation and momentum impaction. This embodiment is of particular interest when the particles directed to the reactor have coarse components, of size comparable with the channels of the labyrinth that could obstruct the passage of the gas through the labyrinth.

4) In a fourth example the invention is performed, either as a tray or as an inlet distributor, on a reactor for the oxidation of sulphur into sulphur oxides, for example as employed downstream the regenerator of the catalyst in the Fluidized Catalytic Cracking process. The targeted aerodynamic cutoff diameter of 0.5 micron and a density of 700 kg/m3. The movable roofs allow to relent these requirements to an aerodynamic cut-off diameter of 2 micron and a density of 1300 kg/m3.

The invention claimed is:

1. An initial kinetic particle separator for separating particles from an inlet fluid stream of a catalytic reactor comprising a perforated inlet differ having outward perforations, a particle settling chamber, a kinetic particle separator, a collection chamber, and a gas exit channel, the kinetic particle separator comprising an acceleration channel, a flow splitting chamber shaped to subject the inlet fluid stream to multiple changes in direction, and a particle deceleration chamber comprising an angled impingement wall for guiding separated particles from the deceleration chamber to the collection chamber, wherein the particle settling chamber is located downstream of the perforated inlet diffuser and upstream of the kinetic particle separator, and wherein the particle settling chamber comprises a transfer chimney for transition of the fluid stream from the particle settling chamber to the kinetic particle separator, the transfer chimney arranged in the particle settling chamber and configured to direct the fluid stream from the outward perforations of the perforated inlet diffuser to the acceleration channel of the kinetic particle separator.

2. The initial kinetic particle separator according to claim 1, wherein the perforated inlet diffuser is in fluid communication with the inlet fluid stream and is in fluid communication with the kinetic particle separator, the kinetic particle separator arranged and configured to change the direction of the fluid stream and separate at least a portion of the particles contained in the fluid stream from the fluid stream at the flow splitting chamber, the kinetic particle separator in fluid communication with the collection chamber via the particle deceleration chamber and in fluid communication with the gas exit channel via the flow splitting chamber, and wherein the particle settling chamber is in fluid communication with the outward perforations of the perforated inlet diffuser and the acceleration channel of the kinetic particle separator.

3. The initial kinetic particle separator according to claim 1, wherein said transfer chimney is arc shaped.

4. The initial kinetic particle separator according to claim 1, wherein said kinetic particle separator comprises a plurality of kinetic particle separators arranged in a cluster.

5. The initial kinetic particle separator according to claim 1, wherein said kinetic particle separator further comprises a screening surface located between the acceleration channel and the particle deceleration chamber, the screening surface comprising supports arranged and configured to allow for passage of particles contained in the fluid stream to the particle deceleration chamber.

6. The initial kinetic particle separator according to claim 1, wherein said acceleration channel has a variable cross section area.

7. The initial kinetic particle separator according to claim 6, wherein the variable cross section area is provided by shutting of a part of the cross section by a guide.

8. The initial kinetic particle separator according to claim 1, further comprising a common serviceable outlet from the collection chamber for removing collected particles.

9. A system comprising a catalytic reactor and the initial kinetic particle separator according to claim 1, wherein the catalytic reactor comprises a cylindrical body in fluid communication with the gas exit channel of the initial kinetic particle separator.

10. The system of claim 9, wherein said kinetic particle separator comprises said acceleration channel, flow splitting chamber, particle deceleration chamber, collection chamber and gas exit channel.

11. The system according to claim 10, wherein said kinetic particle separator comprises a plurality of particle separator units arranged in a cluster.

12. The system according to claim 10, wherein said acceleration channel has a variable cross section area.

13. The system according to claim 12, wherein the variable cross section area is provided by shutting of a part of the cross section by a guide.

14. The system according to claim 10, wherein the kinetic particle separator comprises a common serviceable outlet from the at least one collection chamber for removing collected particles during service.

* * * * *

UNITED STATES PATENT AND TRADEMARK OFFICE
CERTIFICATE OF CORRECTION

PATENT NO. : 10,328,407 B2
APPLICATION NO. : 15/536123
DATED : June 25, 2019
INVENTOR(S) : Emir Zahirovic et al.

Page 1 of 1

It is certified that error appears in the above-identified patent and that said Letters Patent is hereby corrected as shown below:

In the Claims

In Column 8, in Claim 1, Line 29, please delete the word "differ" and replace with --diffuser--.

Signed and Sealed this
Twenty-seventh Day of August, 2019

Andrei Iancu
*Director of the United States Patent and Trademark Office*